July 17, 1951 G. E. SLEEPER, JR 2,560,994

SCANNING SYSTEM FOR MOTION PICTURE FILMS

Filed April 5, 1948

INVENTOR.
GEORGE E. SLEEPER JR.
BY Donald K. Lippincott
ATTORNEY

Patented July 17, 1951

2,560,994

UNITED STATES PATENT OFFICE 2,560,994

SCANNING SYSTEM FOR MOTION PICTURE FILMS

George E. Sleeper, Jr., Berkeley, Calif., assignor to Color Television, Inc., San Francisco, Calif., a corporation of California Application April 5, 1948, Serial No. 18,993

2 Claims. (Cl. 178—5.4)

This invention relates to a scanning system for transmitting color television images from motion picture film. In this system certain of the instrumentalities employed in my previous invention, covered by my co-pending application, Serial No. 747,452, filed May 12, 1947, are employed, and to this extent it may be considered as an improvement on that invention.

Among the objects of my invention are:

To provide a system which adapts the benefits of the "flying spot" method of scanning to colored film;

To provide a system for sequential scanning of television images which does not demand the generation or injection of additional pulses into the television circuits, but, on the contrary, may be accomplished with even simpler electrical apparatus than is required for ordinary black and white interlaced scanning; and To provide a scanning system which does not demand that multiple equipment be accurately synchronized and brought into adjustment, but is, largely, self adjusting.

In the description of the system which follows it will be assumed that the usual three-color method of transmission is used, but it is to be understood that the system may be equally well used with two-color transmissions. The method of adaptation to the two-color system will be obvious to those skilled in the art, since it involves merely the omission of certain elements from the optical system.

Considered broadly, my invention involves progressing the film at a constant speed (i. e., without the usual interrupted motion utilized in direct motion picture projection), the rate of motion being equal to the frame frequency desired; with the frame or repetition frequency now in general use, this would mean progressing the film at a uniform speed of 30 frames per second. A cathode ray tube of the "flying spot" type is provided, over the fluorescent screen of which a trace of the cathode ray beam is scanned. The field scanned by the trace is projected optically upon a gate area of the film which is equal in size to the frame. In terms of the size of the image, the field scanned is an integral number of times the width of the frame on the film, but is equal in length or height of image. The optical system used is such as to project upon the gate area a plurality of superimposed images of the laterally adjacent portions of the field, and each of the images is of a different color. This latter can be accomplished either by making the fluorescent screen of the flying spot tube with vertical stripes of materials fluorescing in different colors, or the usual filters can be provided on the different elements of the optical system.

Preferably the images are displaced slightly in the direction of the motion of the film, so that, as the trace of the beam scans along any individual line, its image as it traverses the successive portions of the field on the cathode ray tube will retraverse the same portion of the film. The scanning is accomplished in such direction that the component of the motion of the image of the flying spot on the film travels in the opposite direction to the film motion itself, with the result that the relative speeds of the image and the film is double the speed of the film. The motion of the film and the vertical scanning oscillations are synchronized, so that the start of the scanning cycle corresponds with the centering of a frame of the film in the gate area. If this single synchronization is properly done, and the horizontal scanning rate is such as to give an odd number of scanning lines, such as the present standard of 525 lines, the result will be that each frame of the film is scanned twice in proper order to produce the standard two-to-one interlace, and each line of the film will be scanned in turn by various colors used in the transmission. Light transmitted by the film is gathered by a photo tube, and generates the signals used for the transmission in the usual manner.

My invention will be more clearly understood by reference to the drawings and the ensuing detailed description.

Figure 1:
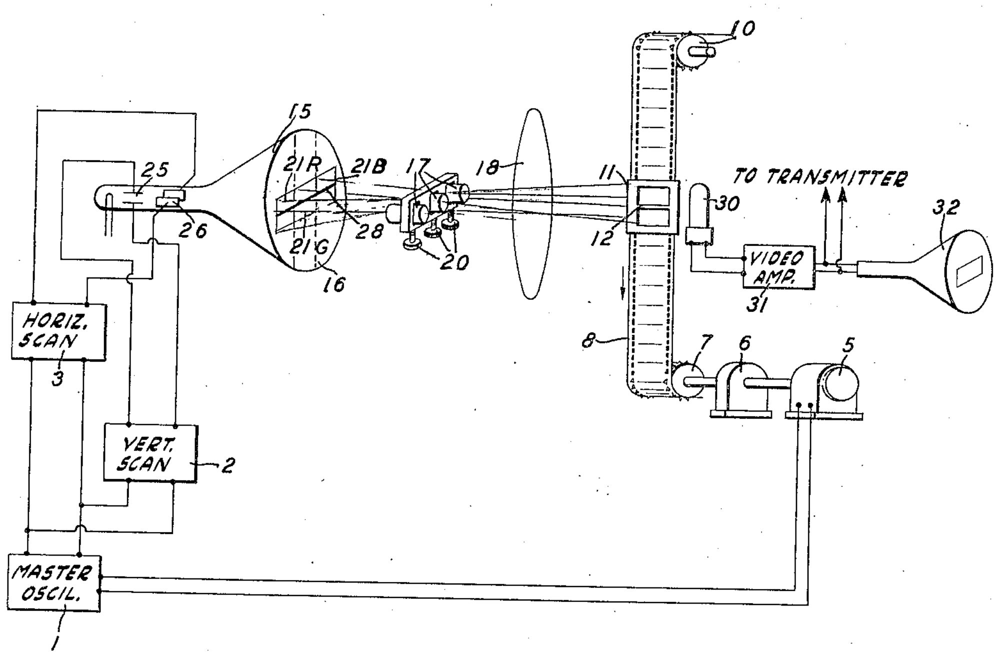
Fig. 1 is a schematic drawing of the system, partly in block and partly in symbolic form.

Referring first to Fig. 1, a master oscillator 1 provides a base frequency from which are derived (in accordance with current standards) a saw-tooth vertical scanning wave of 30 cycles per second, and a horizontal saw-tooth scanning wave at a frequency of 15,750 cycles per second, to give a 525-line picture. These waves are generated in a well-known manner by the vertical scanning generator 2, and horizontal scanning generator 3, respectively. The master oscillator also feeds the synchronous motor 5, which, through a gear box 6, drives a sprocket 7 which progresses the film 8.

The film is pulled down by the drive sprocket over a second sprocket 10, and past a gate area 11. The gate is preferably slightly higher than one frame of the film, and may, if desired, be provided with a central crossbar 12, as is more clearly shown in Fig. 2, for purposes later to be described.

Facing the gate there is mounted a cathode ray tube 15, and multiple images of portions of the screen 16 of this tube are focused upon the gate. The optical system used in this projection may be and is preferably of the type described in my prior application, Ser. No. 747,452, previously mentioned. This optical system comprises three "distributor" lenses (to use the nomenclature of the prior application mentioned) 17, the light from which is collected by a single lens 18 and projected onto the gate area. Distributor elements 17 are adjusted by the means 20 so that the images of the three lateral adjacent portions 21R, 21G and 21B of the field scanned by the tube 15 are relatively displaced slightly in the vertical direction, this displacement being upward, in the case of each successive image scanned by a single sweep of the beam, by an amount equal to two-thirds of the space between the successive lines of scansion.

The scanning of the fluorescent screen 16 starts at the upper left-hand corner of the field scanned, and, by the inversion produced by the optical system, the scanning of the image therefore starts in the lower right-hand corner. If the aspect ratio of the frame on the film is four to three, the aspect ratio of the field scanned on the tube will be twelve to three; i. e., the field scanned on the tube is relatively three times as wide as the motion picture frame. The image of the spot on the film travels in the opposite direction of the film motion, and therefore, by virtue of the displacement of the images, the same line on the film will be traversed by the successive images of the spot on the fluorescent screen as the film is progressed.

The fluorescent screen on the tube may either be formed in strips, as are shown by the dotted lines across the face, fluorescing respectively in red, green, and blue, or a white fluorescent screen may be used and color filters used on the distributor elements 17. Both of these expedients are well known in the art.

The saw-tooth waves from the vertical scanning generator 2 and the horizontal generator 3 are fed to the vertical deflecting plates 25 and horizontal deflecting plates 26 of the cathode ray tube respectively.

Figure 2:
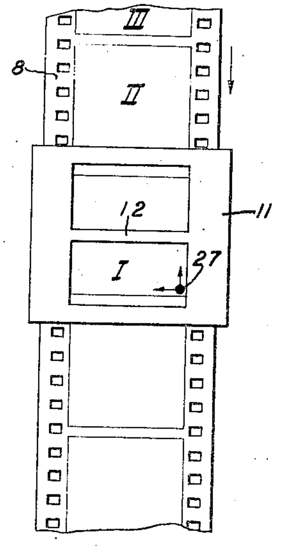
Fig. 2 is a diagram showing the relative positions of the film and the gate at the beginning of the oscillator scanning cycle.

It has already been stated that the motion of the film and the scanning frequency are at the same rate, namely, 30 cycles per second. The vertical scan is phased so that at the beginning of the cycle of the scanning oscillator, at the moment when the beam starts its first horizontal sweep across the tube, the image of the spot 27 will fall in the corner of the frame which is centered in the gate 11 at that instant. The spot sweeps to the left and up as the film moves down. As the spot enters the area 21G, due to the displacement of the green image, the spot will be slightly below its position as shown in Fig. 2, but will fall on the same portions of the film frame, and the same thing will happen again when the spot enters the area 21B to trace the blue image.

Figure 3:
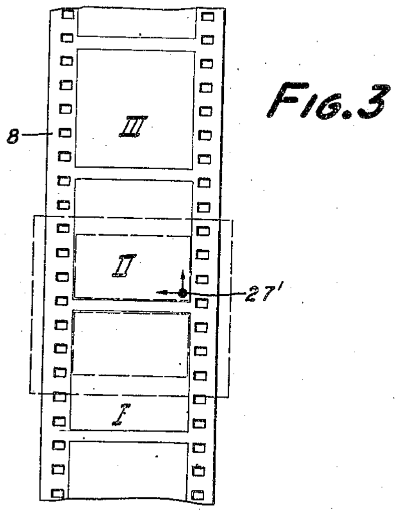
Fig. 3 is a similar diagram showing the positions of gate and film in the middle of the oscillator scanning cycle, the gate, in this instance, being indicated in dotted lines, in order to show more clearly the frames on the film.

In the next sweep the spot will have jumped upward into position to scan the next line. At the end of one-sixtieth of a second the spot will have reached the position indicated by the reference character 27' in Fig. 3, but in the meantime it will have traversed the bar 12 in the gate, and will therefore have been effectively blanked out during this period, since its light cannot then fall upon the film. When it reaches the position shown in Fig. 3, it will have completed scanning frame I, which will, by that time, have passed half-way out of the gate. During the next half of the vertical scanning cycle the spot will scan frame II, and by the end of the second one-sixtieth of a second the latter will be in a position fully to occupy the gate, this occurring just as the scanning cycle is completed (neglecting the fly-back time).

A second scanning of frame II is accomplished in the same manner as the scanning of frame I already described, and the whole operation is repeated for successive frames. The number of scanning lines is odd, as has been described, and the speed of the film is properly synchronized with the scanning speed, and hence the two-to-one interlace provided by present standards is automatically accomplished.

Blanking of the scanning beam between cycles of the scanning oscillator 2 is triggered in synchronism with the fly-back of the vertical scan as is common practice, and therefore it has not been deemed necessary to show here the blanking mechanism. The blanking can be accomplished either by a grid in the tube 15, or the blanking signal can be injected into the video amplifier. The blanking pulses for the alternate half-cycle of the scanning generator need not be separately provided, since this is accomplished by the blacking out due to the crossbar 12 in the gate. This, however, is only one means of accomplishing this. Blanking can also be done by an opaque or non-fluorescent strip 28 across the face of the cathode ray tube, or it may be injected electrically.

Illumination produced by the images of the spot 27 falling upon the film and transmitted by the film falls upon a photocell 30, preferably of the multiplier type. Signals thus produced are fed into a video amplifier 31 and thence into a monitor tube 32 into the radio transmitter (not shown) or transmission line.

The system as thus described possesses the advantage of great simplicity and of ease of adjustment. The only one of the adjustments which is really critical is the displacement of the images so that the different colored spots traverse the same line on the film. It is, of course, necessary that the images of the color fields be of proper size, but this can be roughly accomplished electrically, and a final adjustment may be made by varying the focus. The vertical scan and the speed of the film are automatically synchronized by the use of the same master oscillator to run both, and the ordinary framing device which is provided on all motion picture equipment enables the film to be brought into proper position at the beginning of the scanning cycle; this is accomplished merely by watching the position of the images on the monitor tube.

Broadly, the usefulness of this system is not limited to color film, since a very simple method of interlace is provided for black and white television by substituting an ordinary single optical system for the triple system used with color.

Various other modifications will be at once evident to those skilled in the art. The "gate"

It need not actually be a material gate of the size of a frame, although some method is necessary for holding the film flat while it is being scanned. With many films the unexposed portion between the frames may be sufficient to provide the blanking during the half-cycle interlace period. I therefore do not wish to be limited to the exact composition of apparatus here described in detail, but desire to be protected as broadly as defined by the scope of the following claims.

I claim:

1. A flying-spot television scanning device of the variety wherein a raster on the target of a cathode ray tube is imaged upon a motion picture film strip comprising a centrally divided film gate having two windows and located in the path of the light rays passing between the tube image raster area and the film, said windows each having an aspect ratio such that its long dimension is proportional to the long dimension of the image which is to be produced to simulate the film frame, and such that each of its shorter dimensions is proportional to the second dimension of the image to be produced to simulate the film frame, drive mechanism for moving the film through the film gate at constant speed such that $n$ film frames pass completely through the gate per second; deflecting means for deflecting the cathode ray beam in bidirectional paths at substantially different rates such that the beam motion in the rapid direction is at $n$ times the number of lines scanned per image and the motion in the slower direction is at a rate corresponding to the film frame advance rate of $n$; a light translating element connected to respond to the varying intensities of light and shadow on the film as reflected thereby during tracing of the film by the image of the raster presented thereto through the window of the film gate; an optical system for directing the light of the raster to the continuously moving film through the windows of the film gate so that the film is scanned while passing through the film gate at a rate such that each film frame is scanned $2n$ times during each passage through the complete gate; and means provided between the central division of the film gate windows for suppressing the scanning effect of the beam forming the raster as it scans the film frame within the film gate.

2. A flying spot television film scanning device of the type wherein a raster traced upon the luminescent target of a cathode ray tube under scansion by a cathode ray beam is imaged upon a motion picture film strip subject for image analysis comprising a film gate for positioning the film strip and locating the strip in the path of the light rays issuing from the tube target raster, said film gate having a pair of rectangular windows separated from each other by a dividing strip extending transverse to the long dimension of the film, each of said rectangular windows also having the long dimension substantially corresponding to the long dimension of each film frame and the shorter dimension substantially half the shorter dimension of each film frame; a drive mechanism for moving the film strip subject through the film gate at a constant speed of $n$ film frames per second; cathode ray beam deflecting means connected to deflect the scanning cathode ray beam to trace the image raster in such a manner that the number of complete image rasters traced per second corresponds to the number of film frames passing through the said film gate per second and so that the number of line traces per raster corresponds to the number of lines into which each film frame image is to be analyzed per scanning; means to cause the direction of traverse of the window openings by the light spot originating on the luminescent target under cathode ray beam scansion to move in its slower path of motion in a direction opposite that of film frame advance through the film gate to provide for scanning the film, and means provided by the dividing strip between the window areas of the film gate for suppressing the scanning effect of the light spot image of the beam as it traces the combined window areas.

GEORGE E. SLEEPER, Jr.

REFERENCES CITED

The following references are of record in the file of this patent:

UNITED STATES PATENTS

| Number | Name | Date |
|---|---|---|
| 2,083,203 | Schlesinger | June 8, 1937 |
| 2,163,540 | Clothier | June 20, 1939 |
| 2,189,351 | Schroter | Feb. 6, 1940 |
| 2,225,033 | Condliffe | Dec. 17, 1940 |
| 2,250,479 | Goldmark | July 29, 1941 |
| 2,251,786 | Epstein | Aug. 5, 1941 |
| 2,259,884 | Goldsmith | Oct. 21, 1941 |
| 2,261,848 | Goldmark | Nov. 4, 1941 |
| 2,291,723 | Jensen | Aug. 4, 1942 |
| 2,389,646 | Sleeper | Nov. 27, 1945 |
| 2,413,075 | Schade | Dec. 24, 1946 |
| 2,420,029 | Brady | May 6, 1947 |
| 2,438,269 | Buckbee | Mar. 23, 1948 |

FOREIGN PATENTS

| Number | Country | Date |
|---|---|---|
| 231,805 | Switzerland | July 17, 1944 |
| 562,334 | Great Britain | June 28, 1944 |